United States Patent

Jamieson

[11] Patent Number: 4,751,359
[45] Date of Patent: Jun. 14, 1988

[54] MICROWAVE HOT WATER KETTLE

[76] Inventor: Ian R. Jamieson, 692 - 810 W. Broadway, Vancouver, B.C., Canada, V5Z 4C9

[21] Appl. No.: 1,753

[22] Filed: Jan. 9, 1987

[51] Int. Cl.⁴ ............................................. H05B 6/64
[52] U.S. Cl. .................... 219/10.55 E; 219/10.55 A; 219/10.55 F; 219/10.55 R
[58] Field of Search .................. 219/10.55 A, 10.55 E, 219/10.55 R, 10.55 F

[56] References Cited

U.S. PATENT DOCUMENTS

| | | | |
|---|---|---|---|
| 2,978,562 | 4/1961 | Fox | 219/10.55 A |
| 3,778,578 | 12/1973 | Long et al. | 219/10.55 A |
| 3,812,315 | 5/1974 | Martin | 219/10.55 A |
| 4,029,927 | 6/1977 | McMillan | 219/10.55 R |
| 4,152,567 | 5/1979 | Mayfield | 219/10.55 A |
| 4,165,455 | 8/1979 | Mayfield | 219/10.55 A |
| 4,236,056 | 11/1980 | Allen et al. | 219/10.55 A |
| 4,284,869 | 8/1981 | Pinkstaff | 219/10.55 A |
| 4,310,738 | 1/1982 | Moretti et al. | 219/10.55 A |
| 4,417,116 | 11/1983 | Black | 219/10.55 A |

FOREIGN PATENT DOCUMENTS 3034962  5/1982  Fed. Rep. of Germany ... 219/10.55 F

*Primary Examiner*—A. D. Pellinen
*Assistant Examiner*—Leon K. Fuller
*Attorney, Agent, or Firm*—Schroeder & Siegfried

[57] ABSTRACT

A microwave hot water kettle employing a three magnetron source housed in an accylene or plastic shell having a metallic outer casing. Uniformly distributed throughout the kettle are thin hollow platelets which hold the water to be heated. The reflective outer casing in conjunction with the three magnetron source provides near instantaneous heating of the water without cold spots. The kettle incorporates features for thermostatically controlling water temperature and providing pressure relief of the steam generated.

19 Claims, 1 Drawing Sheet

MICROWAVE HOT WATER KETTLE

BACKGROUND OF THE INVENTION

This invention relates to a hot water heater and in particular to an instantaneous hot water heater utilizing electromagnetic energy confined with in a resonance cavity for heating.

Microwave energy has been used in the past upon repeated occasions for heating solids and fluids. U.S. Pat. No. 2,978,562 issued to H. D. Fox on Apr. 4, 1961 illustrates an instantaneous water heating system for domestic use wherein the water heater heats the fluid on demand, and does not maintain or store a large body of heated water. It employs a spirally wound plastic tubing with a microwave source centered axially therein which is energized when the water begins to flow. Systems such as this are designed to operated in conjunction with a water supply unit and to heat the water from ambiant temperatures to the range of 100° F. to 150° F.

Microwave ovens are in common use today to prepare foods. Microwave ovens cause the water molecules in food to oscillate and thereby generate heat. One common use of todays sophisticated microwave ovens is to heat small amounts of water for use in the making of coffee or tea. A tea kettle amount of boiling water would be very useful in today's modern kitchen for the preparation of coffee, tea, oatmeal, gelatin-like food and many other applications within the kitchen. The present invention provides a kettle of instantaneous hot water.

SUMMARY OF THE INVENTION

The present invention is a microwave hot water kettle providing near instantaneous hot water in a portable kettle shaped appliance. The kettle consists of a handled vessel mounted on a base through which electrical energy is supplied. Located in the lower portion of the vessel are three microwave units providing radiant electromagnetic energy throughout a curved reflective inner surface of the vessel. Using three microwave units provides increased magnetron activity and eliminates cold spots within the vessel. Water to be heated is contained in platelets which distribute the water in thin layers uniformly throughout the vessel. The platelets are transparent to the electromagnetic energy and provide for even heating of the water.

The platelets open to a spout on the kettle. The spout provides for easy filling and emptying of the kettle. Housed in the spout is a control means for thermostatically controlling the temperature of the water and a pressure sensitive gate for relieving steam pressure generated by the boiling water.

DESCRIPTION OF THE PREFERRED EMBODIMENT

Figure 1:
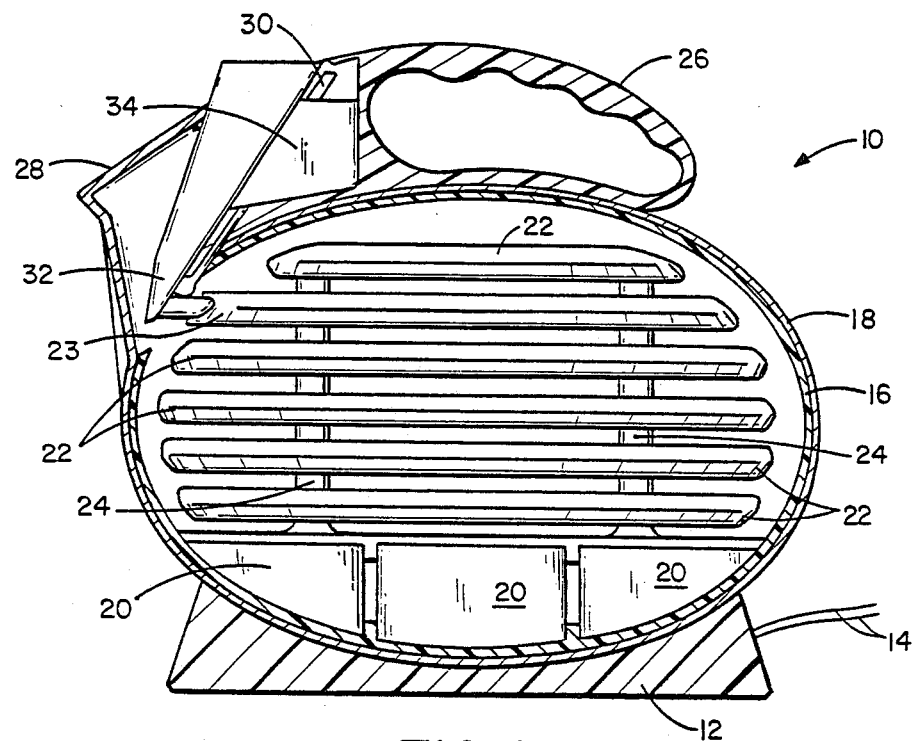
FIG. 1 is a cross-sectional view of the present invention.

Now with reference to the drawings, a microwave hot water kettle incorporating the principals and concepts of the present invention and generally referred to by the reference numeral 10 will be described in detail. Kettle 10 includes a base unit 12 having a power inlet 14 which is designed to carry electrical energy such as that found in typical household wall outlets into the base of the unit for distribution to microwave generation units.

Mounted on the base 12 is the vessel 16 made from accylene or plastic. This accylene or plastic shell is covered by an outer casing 18 which is preferably a highly reflective metal. In the lower portion of the vessel 16 are three microwave generation units 20. Each microwave unit 20 is made up of a magnetron tuned to emit electromagnetic waves at a frequency to heat water. Throughout the central and upper portion of vessel 16 are located interconnected hollow platelets 22. These platelets are made up of accylene, plastic or other dielectric material which is transparent to the microwave energy generated out by the microwave units 20. Interconnecting and supporting the platelets are channels 24. Attached to the top of the kettle vessel is handle 26.

In operation water is poured into the spout 28 located near the top of the kettle vessel 16. The spout 28 is connected to and allows the water to flow into the hollow platelets 22 via connecting channels 24. The microwave units are energized to provide magnetron energy throughout the interior of the vessel. The energy bounces off the curved reflective surface of the kettle, thus providing increased magnetron activity and the elimination of cold spots within the interior of the vessel. The magnetron generators are standard microwave units adapted for use in a curved resonant chamber of the chosen vessel size. It is expected that each magnetron have a power output of approximately 200 watts, the total kettle power output being 600 watts. Microwave radiation is confined to the kettle by the metallic outer case which acts as a electromagnetic shield.

A temperature sensing unit 30 controls the magnetrons to thermostatically maintain the temperature of the water at boiling. A pressure sensitive gate 32 allows steam pressure to escape. Valve control unit 34 houses the temperature sensing unit and pressure sensitive gate. Additionally, the valve control unit 34 acts as a safety interlock to insure that the spout is covered during operation and permits the opening and closing of the spout when not in operation. The closure of the spout prevents microwave radiation from escaping the vessel during operation of the kettle.

Figure 2:
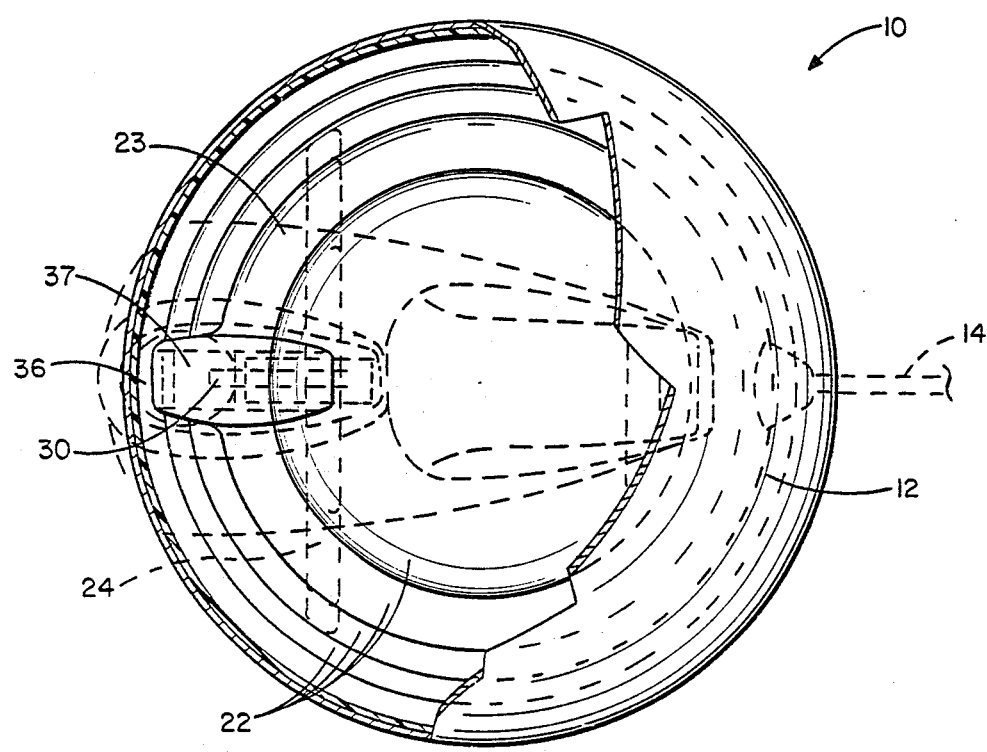
FIG. 2 is a top plan view of the present invention.

Referring to FIG. 2 there is shown in the top view a reservoir 36 which holds any recondensed steam released through the pressure sensitive gate 32. As can be seen in this figure, feeder platelet 23 which is one of the six platelet evenly distributed throughout the vessel communicates with the spout and provides for the inlet and outlet of water to the water holding platelets.

The kettle can be designed to hold any amount of water, but is preferably designed to hold up to 2 liters. The kettle works well for heating less water than its full capacity. When a small amount of water, say 500 ml, is desired the layout of the platelets causes the water to be evenly distributed within the central region of the vessel 16. This even distribution of water allows the magnetron units to effectively couple to the water throughout the crossection of the resonance vessel, providing for an even and rapid heating of the water. The temperature sensing unit 30 will control the magnetron exitation when the water reaches a specified temperature, namely boiling.

The foregoing is considered as illustrative of the principals of the invention. Since numerous modifications and changes would readily occur to those skilled in the art it is not desired to limit the invention to the exact construction and operation shown and described. Furthermore, fluids other than water are intended to be covered by the appendaged claims which define the scope and spirit of the invention.

I claim:

1. An instantaneous hot water heating apparatus comprising:
   a source of electromagnetic energy capable of producing high frequency energy;
   a vessel adapted as a resonance cavity for the electromagnetic energy source;
   a handle positioned on the vessel for grasping;
   a spout opening in the vessel for filling and emptying the vessel; and
   a control means located on the vessel for controlling the temperature and relieving the pressure of the water heated in the vessel.

2. The heating apparatus of claim 1 wherein the vessel is made of a accylene or plastic shell having a metallic outer casing.

3. The heating apparatus of claim 1 wherein the electromagnetic energy source comprises three magnetron units.

4. The heating apparatus of claim 3 wherein each magnetron unit has a power output of approximately 200 watts.

5. The heating apparatus of claim 2 wherein the vessel has a curvilinear shape to cause reflective radiation from the walls of the vessel to transverse a central region of the vessel.

6. An instantaneous hot water heating apparatus comprising:
   a source of electromagnetic energy capable of producing high frequency energy;
   a vessel adapted as a resonance cavity for the electromagnetic energy source;
   a plurality of platelets housed in the vessel for holding water to be heated;
   a handle positioned on the vessel for grasping;
   a spout in communication with the platelets for filling and emptying the vessel; and
   a control means located on the vessel for controlling the temperature and relieving the pressure of the water heated in the vessel.

7. The heating apparatus of claim 6 wherein the vessel is made of a accylene or plastic shell having a metallic outer casing.

8. The heating apparatus of claim 6 wherein the electromagnetic energy source comprises three magnetron units.

9. The heating apparatus of claim 8 wherein each magnetron unit has a power output of approximately 200 watts.

10. The heating apparatus of claim 7 wherein the vessel has a curvilinear shape to cause reflective radiation from the walls of the vessel to transverse a central region of the vessel.

11. The heating apparatus of claim 6 wherein the platelets are evenly distributed throughout the central region of the vessel.

12. The heating apparatus of claim 6 wherein the platelets are made of accylene, plastic, or other dielectric material.

13. A portable instantaneous hot water heating apparatus comprising:
    a source of electromagnetic energy capable of producing high frequency energy;
    a vessel adapted as a resonance cavity for the electromagnetic energy source;
    a base supporting the vessel and providing electrical connections to the electromagnetic energy source;
    a plurality of platelets housed in the vessel for holding water to be heated;
    a handle positioned on the vessel for grasping;
    a spout in communication with the platelets for filling and emptying the vessel; and
    a control means located on the vessel for controlling the temperature and relieving the pressure of the water heated in the vessel.

14. The heating apparatus of claim 13 wherein the vessel is made of a accylene or plastic shell having a metallic outer casing.

15. The heating apparatus of claim 13 wherein the electromagnetic energy source comprises three magnetron units.

16. The heating apparatus of claim 15 wherein each magnetron unit has a power output of approximately 200 watts.

17. The heating apparatus of claim 14 wherein the vessel has a curvilinear shape to cause reflective radiation from the walls of the vessel to transverse a central region of the vessel.

18. The heating apparatus of claim 13 wherein the platelets are evenly distributed throughout the central region of the vessel.

19. The heating apparatus of claim 13 wherein the platelets are made of accylene, plastic, or other dielectric material.

* * * * *